United States Patent [19]
Yamaguchi et al.

[11] Patent Number: 5,609,918
[45] Date of Patent: Mar. 11, 1997

[54] METHOD OF FORMING A TOP COAT

[75] Inventors: Sachio Yamaguchi, deceased, late of Ofunato, by Akira Yamaguchi, heir; Akimasa Nakahata; Satoshi Ikushima, both of Hiratsuka; Yasumasa Okumura, Yokohama; Haruhiko Aida; Shigeo Nishiguchi, both of Hiratsuka; Osamu Isozaki, Yokohama, all of Japan

[73] Assignee: Kansai Paint Company Limited, Amagasaki, Japan

[21] Appl. No.: 477,613

[22] Filed: Jun. 7, 1995

[30] Foreign Application Priority Data

Jun. 13, 1994 [JP] Japan ..................... 6-130254
Jun. 28, 1994 [JP] Japan ..................... 6-146366

[51] Int. Cl.$^6$ ..................... B05D 1/36; B05D 7/00
[52] U.S. Cl. ..................... 427/407.1; 427/409; 427/410; 427/412.1
[58] Field of Search ..................... 427/407.1, 409, 427/410, 412.1

[56] References Cited

U.S. PATENT DOCUMENTS 5,362,521 11/1994 Ozaki et al. ..................... 427/410 X
5,462,770 10/1995 Miyazoe et al. ..................... 427/410 X

*Primary Examiner*—Michael Lusignan
*Attorney, Agent, or Firm*—Armstrong, Westerman, Hattori, McLeland & Naughton

[57] ABSTRACT

The invention provides a method of forming a top coat by forming in sequence a colored base coat on a substrate and a clear coat, the method being characterized in that at least one of the colored base coat and the clear coat is formed by a curable coating composition consisting essentially of:

(a) (a-1) a resin having a hydroxyl group, a carboxyl group and an epoxy group in the same molecule, or (a-2) a mixture of a hydroxyl- and carboxyl-containing resin with a polyepoxide;

(b) a silicon compound having, per molecule, at least one silanol group and/or at least one hydrolyzable group directly bound to a silicon atom; and (c) an organic solvent.

23 Claims, No Drawings

METHOD OF FORMING A TOP COAT

The present invention relates to a novel method of forming a top coat, and more particularly to a coating method capable of forming a top coat excellent in the finishing properties and coating properties such as acid resistance, scratch resistance, etc.

In recent years, air pollution has become worse, and acid rain is causing damages such as withered trees, posing a serious social problem. Acid rain is also attacking coating films on automotive body panels and other articles for outdoor use, and is doing harms such as etching, blushing, spotting, etc. In this situation, there is a strong demand for highly acid-resistant coating films.

Top coats, for example, on automotive exteriors are susceptible to scratch on collision with sands, dusts and the like flying about during the travel of automobiles and on friction with a washing brush. Marred top coats detract from the appearance of automotive exteriors. In particular, scratches stand out on top coats of dark colors e.g. black, dark blue, brown and like colors. Consequently it is earnestly desired to improve the scratch resistance of top coats.

While there has been widely practiced a method of forming a top coat using an amino-curable top coat composition comprising a hydroxyl-containing resin and an amino resin as a binder, a top coat composition satisfactory in the resistance to acid and scratch is still unavailable.

Japanese Unexamined Patent Publications Nos.84,673/1988 and 84,674/1988 disclose methods of forming a top coat using a coating composition comprising an epoxy- and hydroxyl-containing resin and methylhexahydrophthalic anhydride or like cyclic acid anhydride as a curing agent in place of said amino-curable coating composition. However, the disclosed methods have drawbacks of providing a top coat inferior in the finished appearance and resistance to acid and scratch, etc.

An object of the present invention is to provide a novel method of forming a top coat by forming in sequence a colored base coat and a clear coat, the method being free from the foregoing defects.

Another object of the invention is to provide a novel coating method capable of forming a top coat outstanding in the finished appearance, acid resistance, scratch resistance, etc.

These and other objects of the invention will become more apparent from the following description.

According to the present invention, there is provided a method of forming a top coat by forming in sequence a colored base coat on a substrate and a clear coat, the method being characterized in that at least one of the colored base coat and the clear coat is formed by a curable coating composition consisting essentially of:

(a) (a-1) a resin having a hydroxyl group, a carboxyl group and an epoxy group in the same molecule, or (a-2) a mixture of a hydroxyl- and carboxyl-containing resin with a polyepoxide;

(b) a silicon compound having, per molecule, at least one silanol group and/or at least one hydrolyzable group directly bound to a silicon atom; and (c) an organic solvent.

The present inventor conducted extensive research to overcome the foregoing prior art defects and found that when said specific curable coating composition is used to form a top coat in a method of forming a top coat comprising forming in sequence a colored base coat and a clear coat, the prior art defects can be overcome and the objects can be achieved. The present invention has been accomplished based on this novel finding.

The term "silanol group" used throughout the specification and the appended claims refers to a hydroxyl group directly bound to a silicon atom. The term "hydrolyzable group directly bound to a silicon atom" used throughout the specification and the appended claims refers to a group capable of forming a silanol group on hydrolysis.

Substrates useful for forming the colored base coat in the present invention include substrates of metals, in particular, steel plates (for example, those treated by chemical conversion, those treated by chemical conversion and primed by electrodeposition, or those treated by chemical conversion, primed by electrodeposition and coated with an intercoat), substrates of plastics (e.g. those surface-treated, those surface-treated and primed, or those surface-treated, primed and coated with an intercoat), a combination of such substrates and the like.

In the method of forming a top coat according to the invention, at least one of the colored base coat and the clear coat is formed by the curable coating composition consisting essentially of:

(a) a resin (a-1) having a hydroxyl group, a carboxyl group and an epoxy group in the same molecule or a mixture (a-2) of a hydroxyl- and carboxyl-containing resin with a polyepoxide;

(b) a silicon compound having, per molecule, at least one silanol group and/or at least one hydrolyzable group directly bound to a silicon atom; and (c) an organic solvent.

Either the resin (a-1) or the mixture (a-2) is used as the component (a) in the curable coating composition.

The resin (a-1) is a base resin having a hydroxyl group, a carboxyl group and an epoxy group in the same molecule.

The carboxyl group of the resin (a-1) is one of important groups essentially required in the invention for the following advantages. The carboxyl group is capable of promoting the reaction between the hydroxyl group of the resin (a-1) and the silanol group (including a silanol group produced by the hydrolysis of a hydrolyzable group directly bound to a silicon atom) of the silicon compound (b), and the reaction between the silanol groups with each other to improve the low temperature curability of the composition. Further the carboxyl group is allowed to react also with the epoxy group, whereby the coating film is improved in the acid resistance and other properties. Moreover, the carboxyl group is consumed in the reaction with the epoxy group, and little or no carboxyl group is left in the coating film, whereby the coating film is enhanced in the water resistance, acid resistance, scratch resistance, weatherability, etc.

The hydroxyl group of the resin (a-1) is present in an amount sufficient to provide a hydroxyl value of about 10 to about 300 KOHmg/g, preferably about 20 to about 200 KOHmg/g. If the hydroxyl value is less than about 10 KOHmg/g, the low temperature curability, durability and other properties of the composition are degraded. Above about 300 KOHmg/g, an increased amount of unreacted hydroxyl group remains in the coating film, resulting in the decrease of the water resistance and other properties of the coating film. Hence the hydroxyl value outside said range is undesirable.

The carboxyl group of the resin (a-1) is present in an amount sufficient to provide an acid value of about 3 to about 150 KOHmg/g, preferably about 5 to about 80 KOHmg/g. If the acid value is less than about 3 KOHmg/g, the low temperature curability and other properties of the composition are reduced, whereas above about 150 KOHmg/g, the water resistance, weatherability and other properties of the coating film are degraded. Hence the acid value outside said range is undesirable.

The epoxy group of the resin (a-1) is present in an amount sufficient to provide an epoxy value of about 0.1 to about 4.0 mmol/g, preferably about 0.2 to about 3.0 mmol/g. If the epoxy value is less than about 0.1 mmol/g, the low temperature curability and other properties of the composition are reduced, whereas above about 4.0 mmol/g, the acid resistance, weatherability and other properties of the coating film are degraded. Thus the epoxy value outside said range is undesirable.

It is suitable that the resin (a-1) have a number average molecular weight of about 3,000 to about 200,000, preferably about 5,000 to about 80,000. If the average molecular weight is less than about 3,000, the durability and other properties of the coating film are reduced, whereas above about 200,000, an increased amount of the organic solvent (c) is required for dilution, resulting in a decreased solids content of the composition. Hence the number average molecular weight outside said range is undesirable for these disadvantages.

While useful resins (a-1) are not specifically limited and can be suitably selected from conventional resins, acrylic resins are preferred from the viewpoint of the weatherability, durability and other properties of the coating film.

Specific examples of the acrylic resin are copolymers prepared by copolymerizing essential monomers such as hydroxyethyl (meth)acrylate, hydroxypropyl (meth)acrylate, hydroxybutyl (meth)acrylate, (poly)ethylene glycol mono(meth)acrylate, (poly)propylene glycol mono(meth)acrylate, adducts of these monomers with caprolactone ($\epsilon$-caprolactone, etc.) and like hydroxyl-containing acrylic monomers; (meth)acrylic acid, maleic acid (anhydride) and like carboxyl-containing ethylenically unsaturated monomers; glycidyl (meth)acrylate, methyl glycidyl (meth)acrylate, allyl glycidyl ether and like glycidyl group-containing monomers, 3,4-epoxycyclohexylmethyl (meth)acrylate and like alicyclic epoxy-containing monomers and other radically polymerizable epoxy-containing monomers, optionally with other radically polymerizable unsaturated monomers such as methyl (meth)acrylate, ethyl (meth)acrylate, propyl (meth)acrylate, butyl (meth)acrylate, octyl (meth)acrylate, 2-ethylhexyl (meth)acrylate, stearyl (meth)acrylate, cyclohexyl (meth)acrylate and like $C_{1-24}$ alkyl (meth)acrylates or cycloalkyl (meth)acrylates; styrene, vinyl toluene and like aromatic vinyl monomers; (meth)acrylonitrile and like nitrile compounds; and (meth)acrylamide, N-methylol (meth)acrylamide and like amide compounds.

The resin (a-1) can be prepared by copolymerizing said hydroxyl-containing acrylic monomer and said radically polymerizable epoxy-containing monomer, optionally with other radically polymerizable unsaturated monomers to give a hydroxyl- and epoxy-containing resin (hereinafter called "resin (A-1)"), and subjecting the hydroxyl group of the resin (A-1) and a cyclic acid anhydride (hereinafter called "cyclic acid anhydride (A-2)") to ring-opening half-esterification. The cyclic acid anhydride (A-2) used in the reaction is a compound having at least one cyclic carboxylic acid anhydride group per molecule, such as phthalic anhydride, succinic anhydride, tetrahydrophthalic anhydride, tetrabromophthalic anhydride, tetrachlorophthalic anhydride, chlorendic anhydride, carbic anhydride, maleic anhydride, trimellitic anhydride, pyromellitic anhydride and the like. These compounds can be used singly or in combination.

In the ring-opening half-esterification between the hydroxyl group of the resin (A-1) and the cyclic acid anhydride (A-2), typically 1 mole of hydroxyl group is reacted with 1 mole of the cyclic acid anhydride (A-2), whereby the cyclic acid anhydride group is ring-opened to give 1 mole of a free carboxyl group. The ring-opening half-esterification per se can be carried out in a conventional manner, for example, conducted in an organic solvent at a temperature of about 40° to about 100° C. In the reaction, a catalyst such as organotin compounds, organotitanium compounds, organozirconium compounds, etc. can be used to promote the reaction.

The mixture (a-2) as the component (a) in the curable coating composition is a mixture of a hydroxyl- and carboxyl-containing resin (hereinafter called "resin (a-3)") used as a base resin with a polyepoxide (hereinafter called "polyepoxide (a-4)") serving as a crosslinking agent for the resin (a-3).

The carboxyl group of the resin (a-3) is one of the important groups essentially required in the invention for the following advantages. The carboxyl group is capable of promoting the reaction between the hydroxyl group of the resin (a-3) and the silanol group (including a silanol group produced by the hydrolysis of a hydrolyzable group directly bound to a silicon atom) of the silicon compound (b) and the reaction of the silanol groups with each other to improve the low temperature curability of the composition. Further the carboxyl group is allowed to react also with the polyepoxide (a-4), whereby the coating film is improved in the acid resistance and other properties. Moreover, the carboxyl group is consumed in the reaction with the epoxy group, and little or no carboxyl group is left in the coating film, whereby the coating film is enhanced in the water resistance, acid resistance, weatherability and the like.

The carboxyl group of the resin (a-3) is present in an amount sufficient to provide an acid value of about 3 to about 150 KOHmg/g, preferably about 5 to about 80 KOHmg/g. If the acid value is less than about 3 KOHmg/g, the low temperature curability of the composition is reduced, whereas above about 150 KOHmg/g, the water resistance, weatherability and other properties of the coating film are degraded. Hence the acid value outside said range is undesirable.

The hydroxyl group of the resin (a-3) is present in an amount sufficient to provide a hydroxyl value of about 10 to about 300 KOHmg/g, preferably about 20 to about 200 KOHmg/g. If the hydroxyl value is less than about 10 KOHmg/g, the low temperature curability, durability and other properties of the composition are degraded, whereas above about 300 KOHmg/g, an increased amount of unreacted hydroxyl group remains in the coating film, and the water resistance and other properties of the coating film are decreased. Hence the hydroxyl value outside said range is undesirable.

It is suitable that the resin (a-3) have a number average molecular weight of about 3,000 to about 200,000, preferably about 5,000 to about 80,000. If the number average molecular weight is less than about 3,000, the durability and other properties of the coating film are degraded, whereas above about 200,000, an increased amount of the organic solvent (c) is required for dilution, resulting in the decrease in the solids content of the composition. Hence the number average molecular weight outside said range is undesirable for these disadvantages.

While resins useful as the resin (a-3) are not specifically limited and can be suitably selected from conventional resins, it is desirable to use acrylic resins, fluorine-containing resins, polyester resins and the like from the standpoint of the weatherability, durability and other properties of the coating film.

Specific examples of the acrylic resin are copolymers prepared by copolymerizing essential monomers, e.g.

hydroxyethyl (meth)acrylate, hydroxypropyl (meth)acrylate, hydroxybutyl (meth)acrylate, (poly)ethylene glycol mono(meth)acrylate, (poly)propylene glycol mono(meth)acrylate, adducts of these monomers with caprolactone (ε-caprolactone, etc.) and like hydroxyl-containing acrylic monomers, and (meth)acrylic acid, maleic acid (anhydride) and like carboxyl-containing ethylenically unsaturated monomers, optionally with other ethylenically unsaturated monomers, e.g., methyl (meth)acrylate, ethyl (meth)acrylate, propyl (meth)acrylate, butyl (meth)acrylate, octyl (meth)acrylate, 2-ethylhexyl (meth)acrylate, stearyl (meth)acrylate, cyclohexyl (meth) acrylate and like $C_{1-24}$ alkyl (meth)acrylate or cycloalkyl (meth)acrylate, styrene, vinyl toluene and like aromatic vinyl monomers, (meth)acrylonitrile and like nitrile compounds, (meth)acrylamide, N-methylol (meth)acrylamide and like amide compounds, etc.

Specific examples of other acrylic resins which can be used include resins prepared by subjecting to half-esterification part of the hydroxyl group of a hydroxyl-containing acrylic resin (obtained by copolymerizing a hydroxyl-containing acrylic monomer, optionally with other ethylenically unsaturated monomers) with a polybasic acid anhydride (such as maleic anhydride, itaconic anhydride, succinic anhydride, chlorendic anhydride, carbic anhydride, phthalic anhydride, 1,2-cyclohexanedicarboxylic acid, hexahydrophthalic anhydride, trimellitic anhydride, pyromellitic anhydride and the like).

Specific examples of the fluorine-containing resin are resins having a fluorine group in the side chain and prepared by copolymerizing a hydroxyl-containing acrylic monomer, carboxyl-containing ethylenically unsaturated monomer, perfluorobutylethyl (meth)acrylate, perfluorooctylethyl (meth)acrylate, perfluoroisononylethyl (meth)acrylate, perfluorodecylethyl (meth)acrylate or like (meth)acrylate monomers having a perfluoroalkyl group or perfluoroalkenyl group, optionally with other ethylenically unsaturated monomers; resins prepared by copolymerizing hydroxyethyl vinyl ether, hydroxypropyl vinyl ether, hydroxylbutyl vinyl ether, (poly)ethylene glycol monoallyl ether and like hydroxyl-containing vinyl monomers, vinyl fluoride, vinylidene fluoride, ethylene chloride trifluoride, ethylene tetrafluoride and like fluoroolefins, optionally with other ethylenically unsaturated monomers such as ethylene, propylene, butylene, ethyl vinyl ether, butyl vinyl ether, cyclohexyl vinyl ether, vinyl acetate, vinyl butyrate, vinyl propionate and the like to give a hydroxyl-containing resin and reacting part of the hydroxyl group of the obtained hydroxyl-containing resin with a polybasic acid anhydride to introduce a carboxyl group; resins having a fluorine group in the main chain and prepared by copolymerizing said hydroxyl-containing vinyl monomer, said fluoroolefin, (meth)acrylic acid, maleic acid, fumaric acid, itaconic acid, citraconic acid and like carboxyl-containing ethylenically unsaturated monomers, optionally with other ethylenically unsaturated monomers; and so on.

The aforesaid polyester resins are mostly esters of a polybasic acid with a polyhydric alcohol. Chiefly used as polybasic acids is at least one dibasic acid selected from phthalic anhydride, isophthalic acid, terephthalic acid, succinic acid, adipic acid, fumaric acid, maleic anhydride, tetrahydrophthalic anhydride and hexahydrophthalic anhydride. Optionally used are benzoic acid, crotonic acid, p-tert-butyl benzoate and like monobasic acids, trimellitic anhydride, methylcyclohexenetricarboxylic acid, pyromellitic anhydride and like trivalent or higher valence basic acids. Chiefly used as polyhydric alcohols are, for example, dihydric alcohols such as ethylene glycol, propylene glycol, diethylene glycol, butanediol, neopentyl glycol, cyclohexanedimethanol, 1,6-hexanediol and the like. Optionally used are trihydric or higher hydric alcohols such as glycerin, trimethylol ethane, trimethylol propane, pentaerythritol, etc.

The polyepoxide (a-4) of the mixture (a-2) as the component (a) of the curable coating composition used in the invention is a crosslinking agent for the resin (a-3).

The epoxy group of the polyepoxide (a-4) is present in an amount sufficient to provide an epoxy value of about 0.1 to about 4.0 mmol/g, preferably about 0.2 to about 3.0 mmol/g. If the epoxy value is less than about 0.1 mmol/g, the low temperature curability and other properties of the composition are impaired, whereas above about 4.0 mmol/g, the acid resistance, weatherability and other properties of the coating film are degraded. Hence the epoxy value outside said range is undesirable.

It is suitable that the polyepoxide (a-4) have a number average molecular weight of about 120 to about 200,000, preferably about 240 to about 80,000. A polyepoxide having a number average molecular weight of less than about 120 is not easily available, whereas a number average molecular weight of above about 200,000 can not provide a coating composition with a high solids concentration, and gives a high molecular weight to a portion between crosslinks, degrading the solvent resistance, scratch resistance and other properties of the coating film. Hence the number average molecular weight outside said range is undesirable.

Examples of the polyepoxide (a-4) are polymers prepared by radical polymerization of essential monomers, e.g. glycidyl (meth)acrylate, methyl glycidyl (meth)acrylate, allyl glycidyl ether and like glycidyl-containing ethylenically unsaturated monomers, 3,4-epoxycyclohexyl methyl (meth)acrylate and like alicyclic epoxy-containing ethylenically unsaturated monomers and other epoxy-containing ethylenically unsaturated monomers, optionally with other monomers, e.g. hydroxyl-containing ethylenically unsaturated monomers (e.g. said hydroxyl-containing acrylic monomers), $C_{1-24}$ alkyl (meth)acrylate, cycloalkyl (meth)acrylate, aromatic vinyl monomers and other vinyl monomers; diglycidyl ether, 2-glycidyl phenyl glycidyl ether, 2,6-diglycidyl phenyl glycidyl ether and like glycidyl ether compounds, vinyl cyclohexene dioxide, limonene dioxide and like glycidyl- and alicyclic epoxy-containing compounds; dicyclopentadiene dioxide, bis(2,3-epoxycyclopentyl)ether, epoxycyclohexenecarboxylic acid ethylene glycol diester, bis(3,4-epoxycyclohexylmethyl)adipate, 3,4-epoxycyclohexylmethyl-3,4-epoxycyclohexane carboxylate, 3,4-epoxy-6-methylcyclohexylmethyl-3,4-epoxy-6-methylcyclohexane carboxylate and like alicyclic epoxy-containing compounds, etc. Among them, preferred are polymers composed of epoxy-containing ethylenically unsaturated monomers or a combination of these monomers and hydroxyl-containing ethylenically unsaturated monomers from the viewpoint of an excellent low temperature curability.

Described below are suitable proportions of the resin (a-3) and the polyepoxide (a-4) in the mixture (a-2) based on the total amount of the resin (a-3) and the polyepoxide (a-4).

A suitable proportion of the resin (a-3) is about 20 to about 80% by weight, preferably about 40 to about 80% by weight. Less than about 20% by weight reduces the amount of the base resin in the composition, thereby degrading the finished appearance and some properties of the coating film, whereas above about 80% by weight decreases the solids content of the resin composition and lowers the curability thereof. Hence the proportion outside said range is undesirable.

A suitable proportion of the polyepoxide (a-4) is about 20 to about 80% by weight, preferably about 20 to about 60% by weight. The proportion outside said range lowers the curability and is undesirable.

The silicon compound (b) present in the curable coating composition contains, per molecule, at least one silanol group and/or at least one hydrolyzable group directly bound to a silicon atom. The compound is used as a crosslinking agent for the component (a).

The hydrolyzable group is a residue which produces a silanol group on hydrolysis in the presence of water. Examples of the hydrolyzable group are methoxy, ethoxy, propoxy and like $C_{1-3}$ alkoxyl groups, acetoxy, propionyloxy and like acyloxy groups.

Examples of the silicon compound (b) are polymers prepared by radical polymerization of monomers, e.g. vinyl trimethoxysilane, vinyl triethoxysilane, vinyl tris(2-methoxyethoxy)silane, γ-(meth)acryloyloxypropyl trimethoxysilane, β-(meth)acryloyloxyethyl trimethoxysilane and like radically polymerizable unsaturated group-containing silicon compounds, optionally with other monomers, e.g. hydroxyethyl (meth)acrylate, hydroxypropyl (meth)acrylate, hydroxybutyl (meth)acrylate, (poly)ethylene glycol mono(meth)acrylate, (poly)propylene glycol mono(meth)acrylate, adducts of these monomers with caprolactone (ε-caprolactone, etc.) and like hydroxyl-containing acrylic monomers, (meth)acrylic acid, maleic acid (anhydride) and like carboxyl-containing ethylenically unsaturated monomers, glycidyl (meth)acrylate, methyl glycidyl (meth)acrylate, allyl glycidyl ether and like glycidyl group-containing monomers, 3,4-epoxycyclohexylmethyl (meth)acrylate, and like alicyclic epoxy-containing monomers and other radically polymerizable epoxy-containing monomers, methyl (meth)acrylate, ethyl (meth)acrylate, propyl (meth)acrylate, butyl (meth)acrylate, octyl (meth)acrylate, 2-ethylhexyl (meth)acrylate, stearyl (meth)acrylate or cyclohexyl (meth)acrylate and like $C_{1-24}$ alkyl (meth)acrylate or cycloalkyl (meth)acrylate, styrene, vinyl toluene and like aromatic vinyl monomers, (meth)acrylonitrile and like nitrile compounds, (meth)acrylamide, N-methylol (meth)acrylamide and like amide compounds and other ethylenically unsaturated monomers, said polymers preferably having a number average molecular weight of about 3,000 to about 200,000; a silicon monomer represented by the formula $$Si(OR)_4 \qquad (I)$$

wherein R is the same or different and represents a hydrogen atom, or $C_{1-3}$ alkyl group; a low condensate (low-degree condensed product) of said silicon monomer; a modified silicon condensate which is a low condensate of said silicon monomer modified in that the group R is partly substituted by a $C_{4-24}$ (preferably $C_{4-8}$) monovalent hydrocarbon group (which may contain an ether bond and/or ester bond); polymers prepared by radical polymerization of an ethylenically unsaturated group-containing silicon condensate (prepared by reacting the low condensate of the silicon monomer and/or the modified silicon condensate with an ethylenically unsaturated monomer containing, per molecule, one ethylenically unsaturated group and a functional group reactive with an SiOR group (R is the same as above)) optionally with said other ethylenically unsaturated monomers, said polymers preferably having a number average molecular weight of about 3,000 to about 200,000.

The low condensate of the silicon monomer and the modified silicon condensate useful as the silicon compound (b) can be advantageously used because of their high solid content, low costs and capability of forming a coating film of excellent properties. The modified silicon condensate and the polymer formed from the condensate useful as the silicon compound (b) are more preferred since they provide a coating film superior in the finishing properties, acid resistance and other properties.

Suitable low condensates of the silicon monomers are those prepared by the condensation of said silicon monomers with each other (formed from about 2 to about 100 molecules of the monomer, preferably about 2 to about 10 molecules thereof). Examples of commercially available products as said low condensates of silicon monomers are "COLCOTE ES 40" (product of Colcote Co., Ltd., polymers formed from 1 to 10 molecules (average of about 5 molecules) of tetraethyl silicate), "COLCOTE MS 51" (product of the company, polymers formed from 1 to 10 molecules (average of about 4 molecules) of tetramethyl silicate), etc. These low condenstates manufactured by Colcote Co., Ltd. presumably have a structure represented by the formula

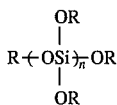

wherein R is as defined above and n is an integer of 1 to 10.

Examples of the $C_{4-24}$ monovalent hydrocarbon group in the modified silicon condensate include butyl, pentyl, hexyl, heptyl, octyl, decyl, stearyl, cycloalkyl and like cyclic or straight- or branched-chain alkyl groups, phenyl, toluoyl, xylyl and like aryl groups, benzyl and like aralkyl groups (alkyl substituted by aryl).

Examples of the hydrocarbon group containing an ether bond are a group represented by the formula

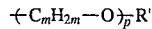

wherein m is an integer of 1 to 3, p is 1 or 2 and R' is a $C_{1-8}$ alkyl group, a group represented by the formula

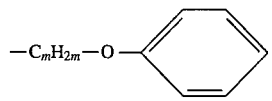

wherein m is as defined above. More specific examples include groups represented by the formulas

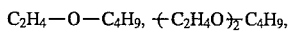

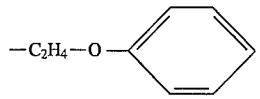

Examples of the hydrocarbon group containing an ester bond include a group represented by the formula

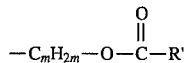

wherein R" is a $C_{1-8}$ cyclic or straight- or branched-chain alkyl group, aryl group or aralkyl group and m is as defined above. More specific examples are groups represented by the formulas

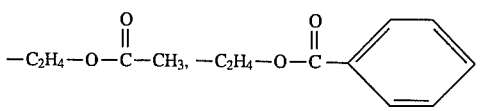

Examples of the hydrocarbon group having both an ether bond and an ester bond include a group represented by the formula

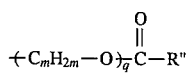

wherein q is an integer of 2 or more, preferably 2 to 10 and m and R" are as defined above. More specific examples are groups represented by the formulas

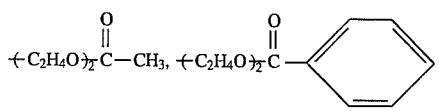

The modified silicon condensate can be prepared from the silicon monomer wherein the group R is partly substituted by a $C_{4-24}$ monovalent hydrocarbon group, for example, by subjecting the monomer to condensation reaction, or by subjecting the low condensate of the silicon monomer and $C_{4-24}$ alcohol (optionally containing an ether bond and/or an ester bond) to an alcohol-removing reaction to partly substitute the group R of the low condensate by a $C_{4-24}$ hydrocarbon group.

The polymer of ethylenically unsaturated group-containing silicon condensate can be prepared by subjecting to an alcohol-removing reaction the low condensate of the silicon monomer and/or modified silicon condensate, together with an ethylenically unsaturated monomer having, per molecule, at least one functional group (such as a hydroxyl group and like active hydrogen group) reactive with an SiOR group in the low condensate of the silicon monomer or modified silicon condensate, and one ethylenically unsaturated group to partly substitute the group R of the SiOR group by the ethylenically unsaturated monomer, giving an ethylenically unsaturated group-containing silicon condensate having an average of one ethylenically unsaturated group per molecule, and radically polymerizing the condensate alone or in combination with said other ethylenically unsaturated monomer.

Preferred examples of the ethylenically unsaturated monomer having at least one functional group reactive with an SiOR group and one ethylenically unsaturated group are hydroxyethyl (meth)acrylate, hydroxypropyl (meth)acrylate, hydroxybutyl (meth)acrylate, (poly)ethylene glycol mono(meth)acrylate, (poly)propylene glycol (meth)acrylate, hydroxyethyl vinyl ether, hydroxypropyl vinyl ether, hydroxybutyl vinyl ether, (poly)ethylene glycol monoallyl ether, adducts of these monomers with caprolactone and like hydroxyl-containing ethylenically unsaturated monomers, etc.

If the polymer used as the silicon compound (b) has a number average molecular weight of less than about 3,000, it tends to degrade the acid resistance and other properties of the coating film, whereas the polymer with a number average molecular weight of over about 200,000 is likely to reduce the solid content of the composition and lowers the finished appearance of the coating film. Hence the polymer with a number average molecular weight outside said range is undesirable.

Described below are suitable proportions of the components (a) and (b) based on the total amount of these components.

A suitable proportion of the component (a) is about 30 to about 98% by weight, preferably about 50 to about 95% by weight. The proportion of less than about 30% by weight reduces the base resin content in the composition, thereby degrading the finished appearance and some properties of the coating film, whereas the proportion of more than about 98% by weight lowers the solid content of the composition and decreases the curability thereof. Hence the proportions of the component (a) outside said range are undesirable.

A suitable proportion of the component (b) is about 2 to about 70% by weight, preferably about 5 to about 50% by weight. The proportions outside said range reduce the curability of the composition and hence are undesirable.

The organic solvent (c) is used in the curable coating composition to disperse or dissolve the components (a) and (b). Useful organic solvents are not specifically limited and can be suitably selected from conventional organic solvents capable of dispersing or dissolving the components (a) and (b).

Specific examples of the organic solvent (c) are toluene, xylene and like aromatic hydrocarbons, acetone, methyl ethyl ketone, methyl isobutyl ketone and like ketones, ethyl acetate, propyl acetate, butyl acetate and like esters, ethylene glycol monobutyl ether and like alcohols, etc.

The organic solvent (c) is used in an amount sufficient to provide a resin composition with a solid content of about 10 to about 70% by weight.

Optionally the curable coating composition used in the invention may contain, in addition to the components (a) to (c), a curing catalyst, extender pigment, UV absorber, UV stabilizer, rheology control agent and other additives for coating compositions.

The curable coating composition can be used as a colored base coat composition by incorporating a coloring pigment, in addition to the components (a) to (c).

As pigments which may be incorporated in said coating composition, there may be mentioned, for example, organic pigments, e.g. quinacridone pigments such as quinacridone red, azo pigments such as pigment red, phthalocyanine pigments such as phthalocyanine blue and phthalocyanine green, inorganic powdery pigments such as titanium oxide, and carbon black, and inorganic flake pigments such as aluminum flakes, nickel flakes, copper flakes, brass flakes, chromium flakes, pearl micas, colored pearl micas, etc.

The curable coating composition as defined hereinbefore for use in the invention can be used by itself as a clear coat composition. For the clear coat formation, the composition may contain a pigment selected from said examples to an extent of not completely hiding the colored base coat previously deposited.

The coating method of the present invention is to form a top coat by forming in sequence a colored base coat and a clear coat over a substrate. One or both of the colored base coat and the clear coat are formed by the curable coating composition for use as a top coat composition according to the invention.

Since the curable coating composition used in the present invention can produce a coating film excellent in the acid resistance, scratch resistance and other properties, it is desirable to use the composition in order to form a clear coat. Furthermore, the curable coating composition is superior in the low temperature curability.

The coating method of the invention is particularly suitable for forming a top coat over automotive bodies and household electric appliances.

The coating method of the invention can be conducted in the conventional manner as done in the automotive industry and household electric appliance industry, for example, according to a 2-coat one-bake or 2-coat 2-bake system for superposed layers of colored base coat/clear coat, or by a 3-coat one-bake or 3-coat 2-bake system for superposed layers of colored base coat/clear coat/clear coat.

Among these methods, the 2-coat one-bake system is preferred. The 2-coat one-bake coating method using the curable coating composition for a clear coat is described below as a typical example.

First, a coating composition for a colored base coat is applied to a substrate usually by spray coating.

Used as a coating composition for a colored base coat is a coating composition comprising the above-defined curable coating composition and a coloring pigment, or alternatively a coating composition for a colored base coat per se known, e.g. for automobiles.

Conventional coating compositions for a colored base coat per se known include curable coating compositions comprising a color pigment and a combination of resin components selected from acrylic resin/amino resin, alkyd resin/amino resin, polyester resin/amino resin, acrylic resin/polyisocyanate, alkyd resin/polyisocyanate, polyester resin/polyisocyanate, etc. Preferred as amino resins are melamine resins.

Conventional coating compositions for a colored base coat per se known are not specifically limited in the form of composition and can take any of forms including organic solvent diluted compositions, nonaqueous dispersion compositions, aqueous solution compositions, aqueous dispersion compositions, high solid compositions, etc.

The spray coaters which can be used for the spray application include conventional air spray guns, airless spray guns, electrostatic air spray coaters, electrostatic airless spray coaters, electrostatic rotatable atomizing coaters, etc.

A preferred thickness of a cured base coat is about 10 to about 30 μm.

The coating composition applied for a colored base coat is left to stand at room temperature for a few minutes or is force-dried at a temperature of about 50° to about 80° C. for a few minutes. After application of the base coat composition in this way, the curable coating composition for a clear coat is applied.

The same application method and same coater as used for forming the colored base coat are employable for forming a clear coat.

A desirable thickness of a cured clear coat is about 20 to about 80 μm.

Subsequently the colored base coat and the clear coat thus applied are heated simultaneously for curing. Suitable heating conditions are a heating temperature of about 100° to about 180° C. and a heating time of about 10 minutes to about 2 hours.

According to the coating method of the present invention, the obtained top coat is imparted a remarkable finished appearance and a high resistance to acid, scratch, weather, etc. because the specific curable coating composition is used for forming the top coat.

The following Preparation Examples, Examples and Comparative Examples illustrate the present invention in further detail.

| Preparation Example 1 |  |
| --- | --- |
| Preparation of Resin (a) containing hydroxyl group, carboxyl group and epoxy group | |
| 2-Hydroxyethyl methacrylate | 130 g |
| Acrylic acid | 36 g |
| Glycidyl methacrylate | 142 g |
| Isobutyl methacrylate | 492 g |
| Styrene | 200 g |
| Azobisdimethylvaleronitrile | 70 g |

The mixture of the above ingredients was added dropwise to 1000 g of xylene at 80° C. and reacted for 5 hours, giving an acryl polyol having a number average molecular weight of 8,000, a hydroxyl value of 56 KOHmg/g, an acid value of 25 KOHmg/g and an epoxy value of 0.95 mmol/g.

Preparation Example 2

Preparation of Resin (b) containing hydroxyl group, carboxyl group and epoxy group A 148 g quantity of phthalic anhydride and 0.5 g of butyltin laurate were added to 2000 g of a 50% solution of an acryl polyol (number average molecular weight of 8,500) in xylol, the acryl polyol consisting of 260 g of 2-hydroxyethyl methacrylate, 284 g of glycidyl methacrylate, 200 g of styrene and 256 g of n-butyl methacrylate. Ring-opening reaction of acid anhydride groups was carried out at 50° C. for 6 hours, giving an acryl polyol having a number average molecular weight of 10,000, a hydroxyl value of 49 KOHmg/g, an acid value of 48 KOHmg/g and an epoxy value of 1.72 mmol/g.

Preparation Example 3

Preparation of Resin (c) containing hydroxyl group, carboxyl group and epoxy group A 100 g quantity of succinic anhydride and 0.5 g of butyltin laurate were added to 2,000 g of a 50% solution of an acryl polyol (number average molecular weight of 9,000) in xylol, the acryl polyol consisting of 290 g of 2-hydroxyethyl acrylate, 3,4-epoxycyclohexyl methyl methacrylate and 416 g of n-butyl methacrylate. Ring-opening reaction of acid anhydride groups was carried out at 50° C. for 6 hours, giving an acryl polyol having a number average molecular weight of 10,000, a hydroxyl value of 158 KOHmg/g, an acid value of 50 KOHmg/g and an epoxy value of 1.35 mmol/g.

| Preparation Example 4 |  |
| --- | --- |
| Preparation of Resin (d) containing hydroxyl group and carboxyl group | |
| 2-Hydroxyethyl acrylate | 232 g |
| Acrylic acid | 72 g |
| n-Butyl methacrylate | 546 g |
| Styrene | 150 g |
| Azobisisobutyronitrile | 20 g |

The mixture of the above ingredients was added dropwise to 1,000 g of xylene at 110° C. and reacted for 5 hours, giving an acryl polyol having a number average molecular weight of 20,000, a hydroxyl value of 112 KOHmg/g and an acid value of 56 KOHmg/g.

Preparation Example 5

Preparation of Resin (e) containing hydroxyl group

| 2-Hydroxyethyl acrylate | 232 g |
|---|---|
| n-Butyl methacrylate | 618 g |
| Styrene | 150 g |
| Azobisisobutyronitrile | 20 g |

The mixture of the above ingredients was added dropwise to 1,000 g of xylene at 110° C. and reacted for 5 hours, giving an acryl polyol having a number average molecular weight of 20,000, a hydroxyl value of 112 KOHmg/g and an acid value of 0 KOHmg/g.

Preparation Example 6

Preparation of Polyepoxide (i)

| 3,4-Epoxycyclohexyl methyl methacrylate | 392 g |
|---|---|
| 2-Ethylhexyl methacrylate | 608 g |
| Azobisisobutyronitrile | 20 g |

The mixture of the above ingredients was added dropwise to 1,000 g of xylene and reacted for 5 hours, giving polyepoxide (i) having a number average molecular weight of 20,000 and an epoxy value of 2.0 mmol/g.

Preparation Example 7

Preparation of Polyepoxide (ii)

| Glycidyl methacrylate | 213 g |
|---|---|
| 2-Ethylhexyl methacrylate | 287 g |
| n-Butyl acrylate | 300 g |
| Styrene | 200 g |
| Azobisisobutyronitrile | 20 g |

The mixture of the above ingredients was added dropwise to 1,000 g of xylene at 110° C. and reacted for 8 hours, giving polyepoxide (ii) having a number average molecular weight of 20,000 and an epoxy value of 1.5 mmol/g.

Preparation Example 8

Preparation of Polyepoxide (iii)

| Glydicyl methacrylate | 213 g |
|---|---|
| 2-Hydroxyethyl acrylate | 232 g |
| 2-Ethylhexyl methacrylate | 342 g |
| Styrene | 150 g |
| Azobisisobutyronitrile | 20 g |

The mixture of the above ingredients was added dropwise to 1,000 g xylene at 110° C. and reacted for 5 hours, giving polyepoxide (iii) having a number average molecular weight of 20,000 and an epoxy value of 1.6 mmol/g.

Preparation Example 9

Preparation of Silicon Compound I

| γ-Methacryloxypropyl trimethoxysilane | 375 g |
|---|---|
| n-Butyl acrylate | 625 g |
| Azobisisobutyronitrile | 20 g |

The mixture of the above ingredients was added dropwise to 1,000 g of xylene at 110° C. and reacted for 8 hours, giving silicon compound I which was an acrylic resin having a number average weight of 20,000 and containing an average of 30 alkoxysilane groups per molecule.

Preparation Example 10

Preparation of Silicon Compound II

| "COLCOTE ES40" | 850 g |
|---|---|
| 2-Hydroxyethyl methacrylate | 150 g |
| Tris(acetylacetonato)aluminum | 0.1 g |
| Hydroquinone | 1 g |

The mixture of the above ingredients was subjected to condensation reaction at 120° C. for 3 hours to remove 53 g of ethanol, giving a silicon-containing monomer having an average of one unsaturated bond per molecule.

| Obtained silicon-containing monomer | 300 g |
|---|---|
| Hydroxyethyl acrylate | 232 g |
| n-Butyl methacrylate | 468 g |
| Azobisisobutyronitrile | 30 g |

The mixture of the above ingredients was added dropwise to 1,000 g of xylene at 100° C. and reacted for 8 hours, giving silicon compound II which was an acrylic resin having a number average molecular weight of 15,000.

Preparation Example 11

Preparation of Silcon Compound III

| "COLCOTE ES40" | 530 g |
|---|---|
| Benzyl alcohol | 470 g |
| Tris(acetylacetonato)aluminum | 0.1 g |

The mixture of the above ingredients was subjected to condensation reaction at 160° C. for 6 hours to remove 200 g of ethanol, giving silicon compound III. The compound had an average of about 12 ethoxy groups per molecule among which six were substituted by

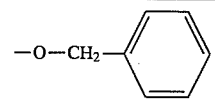

Preparation Example 12

Preparation of Silicon Compound IV

| "COLCOTE ES40" | 705 g |
|---|---|
| Hydroxy ethyl acetate | 295 g |
| Tris(acetylacetonato)aluminum | 0.1 g |

The mixture of the above ingredients was subjected to condensation reaction at 160° C. for 6 hours to remove 44 g of ethanol, giving silicone compound IV. The compound had an average of 12 ethoxy groups per molecule among which three were substituted by

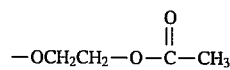

Preparation Examples, Examples and Comparative Examples illustrating coating compositions containing, as component (a), resin (a-1) containing hydroxyl group, carboxyl group and epoxy group in the same molecule

Preparation Example 13

Preparation of compositions for clear coat

Compositions (C-1) to (C-15) for a clear coat were prepared using the components shown in Table 1 in the amounts shown in the table. Among them, Compositions (C-1) to (C-12) were prepared for the method of the present invention, whereas compositions (C-13) to (C-15) were prepared for comparison.

Preparation Example 14

Preparation of compositions (B-1) to (B-5) for colored base coat

Compositions (B-1) to (B-4) for a colored base coat were prepared using the components shown in Table 1 in the amounts shown in the table.

TABLE 1

|  | Compositions for clear coat | | | | | | | | | |
| --- | --- | --- | --- | --- | --- | --- | --- | --- | --- | --- |
|  | C-1 | C-2 | C-3 | C-4 | C-5 | C-6 | C-7 | C-8 | C-9 | C-10 |
| Resin (a) | 70 | 70 | 80 | 80 |  |  |  |  |  |  |
| Resin (b) |  |  |  |  | 70 | 80 | 80 | 90 |  |  |
| Resin (c) |  |  |  |  |  |  |  |  | 60 | 70 |
| Silicon Compound I | 30 |  |  |  | 30 |  |  |  | 40 |  |
| Silicon Compound II |  | 30 |  |  |  | 20 |  |  |  | 30 |
| Silicon Compound III |  |  | 20 |  |  |  | 20 |  |  |  |
| Silicon Compound IV |  |  |  | 20 |  |  |  | 10 |  |  |
| Aluminum paste |  |  |  |  |  |  |  |  |  |  |

|  | Composition for clear coat | | | | | Composition for colored base coat | | | |
| --- | --- | --- | --- | --- | --- | --- | --- | --- | --- |
|  | C-11 | C-12 | C-13 | C-14 | C-15 | B-1 | B-2 | B-3 | B-4 |
| Resin (a) |  |  | 100 |  |  |  |  |  |  |
| Resin (b) |  |  |  | 100 |  | 75 | 75 | 75 | 75 |
| Resin (c) | 90 | 90 |  |  | 100 |  |  |  |  |
| Silicon Compound I |  |  |  |  |  | 25 |  |  |  |
| Silicon Compound II |  |  |  |  |  |  | 25 |  |  |
| Silicon Compound III | 10 |  |  |  |  |  |  | 25 |  |
| Silicon Compound IV |  | 10 |  |  |  |  |  |  | 25 |
| Aluminum paste |  |  |  |  |  | 8 | 8 | 8 | 8 |

In Table 1, the amounts are expressed in grams on solid basis, and the aluminum paste is "ALPASTE 4919" (trademark, product of TOYO ALUMINUM K.K., aluminum flake paste having a solid content of 65% by weight).

Composition (B-5) for a colored base coat was prepared by mixing 75 g (as solids) of resin (b) obtained in Preparation Example 2, 25 g (as solids) of "U-VAN 20SE" (trademark, product of Mitsui Toatsu Chemicals, butylated melamine resin having a solid content of 60% by weight) and 8 g (as solids) of "ALPASTE 4919".

Preparation Example 15

Preparation of substrate

"ELECRON # 9400" (trademark, an epoxy resin-based cationic electrophoretic coating composition manufactured by KANSAI PAINT CO., LTD.) was applied to a dull-finished steel panel (with a surface treated by chemical conversion) to a thickness of 25 μm (when cured). After the coating was heated for curing at 170° C. for 30 minutes, "ES Primer Surfacer TP-37" (trademark, product of KANSAI PAINT Co., Ltd., a polyester resin/melamine resin-based intermediate coating composition for an automotive body) was applied as an intermediate coating to a thickness of 30 μm, and the coating was heated for curing at 140° C. for 30 minutes. Subsequently, the surface of the coating film was abraded using a #400 sandpaper with application of water, dried by hydro-extraction and wiped with a cloth piece impregnated with petroleum benzine. The obtained coated panel was used as the substrate.

EXAMPLE 1

A two-coat one-bake method was carried out in the following manner.

A coating composition was prepared by adding xylol to composition (B-5) for a colored base coat to adjust the viscosity to 14 seconds (as measured by Ford cup No. 4 at 20° C., the same applies hereinafter). The coating composition was sprayed to the substrate to form a colored base coat with a thickness of about 15 μm (when cured).

After 3-minute standing of the applied colored base coat, a clear coat was formed on the colored base coat by spraying, to a thickness of about 40 μm (when cured), a coating composition prepared by adding xylol to composition (C-1) for a clear coat to adjust the viscosity to 25 seconds.

Subsequently the colored base coat and clear coat were simultaneously heated for curing at 120° C. for 30 minutes to thereby form a top coat.

EXAMPLES 2 TO 17 AND COMPARATIVE EXAMPLES 1 TO 3

Top coats were formed in the same manner as in Example 1 by a two-coat one-bake method using the compositions for a colored base coat and compositions for a clear coat shown in Table 2.

The top coats obtained in Examples and Comparative Examples were tested for finishing properties (appearance, gloss and distinctness-of-image gloss) and film properties by the following methods.

Appearance:

The coating surface was checked for abnormal change such as dulling, shrinkage, cracking, flaking and opaqueness or haze.

Gloss:
Determined as a 60-deg specular reflection factor (%).
Distinctness-of-image gloss:
Determined using "PGD-IV type meter" (product of Japan Color Research Institute, a distinctness-of-image gloss meter). The larger the value is, the higher the distinctness-of-image gloss is.
Solvent resistance:
The coating surface was rubbed with a gauze piece impregnated with xylol by 10 reciprocating strokes and then the coating surface was visually evaluated according to the following criteria.

A: No change

B: Markedly marred

C: Swollen and prone to blushing

Adhesion:
Crosswise cuts (11 legthwise cuts and 11 breadthwise cuts with a space of 1.5 mm) were made on the coating surface with a knife to form 100 squares, an adhesive cellophane tape of 24 mm width was affixed to the cut surface and then peeled off. The result was evaluated by counting the number of squares remaining on the substrate and was rated as follows.

A: 100 squares remaining

B: 99 to 95 squares remaining

C: 94 or less squares remaining

Scratch resistance:
Determined with use of a color fastness friction tester (product of Daiei Kagakuseiki Seisakusho). A thick paste was prepared by kneading a polishing powder (DARUMA-CLEANSER) with water, and the paste was placed over the coating surface. The coating surface was rubbed by 25 reciprocating strokes with a tester terminal superposed on the paste under a load of 0.5 kg. The rubbed coating surface was thereafter evaluated according to the following criteria.

AA: No change

A: Slight dulling compared with gloss before rubbing

B: Noticeable dulling compared with gloss before rubbing

C: Marked dulling compared with gloss before rubbing

Acid resistance:
A 0.4 cc quantity of 40 wt.% sulfuric acid solution was applied dropwise to the coating surface, and the wetted coating surface was then dried at 75° C. for 15 minutes and washed with water. Thereafter, the depth (μm) of indents (etching) resulting from the erosion by sulfuric acid was measured.

Weather resistance:
Determined using a QUV weather-o-meter (product of The Q Panel Co., Ltd., equipped with a UV fluorescent lamp "No QFS-40, UV-B" having a wavelength range of 320 to 280 mm). The coating surface was irradiated with UV rays for 15 minutes and then exposed to dew condensation for 15 minutes as one cycle at a temperature of 40° to 70° C. After repeating this cycle for 2,000 hours, the coating surface was checked for the degree of degradation.

The results are shown in Table 2.

TABLE 2

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Composition for colored base coat | | B-5 | B-5 | B-5 | B-5 | B-5 | B-5 | B-5 | B-5 | B-5 | B-5 | B-5 |
| Composition for clear coat | | C-1 | C-2 | C-3 | C-4 | C-5 | C-6 | C-7 | C-8 | C-9 | C-10 | C-11 |
| F-P | Appearance | Good | Good | Good | Good | Good | Good | Good | Good | Good | Good | Good |
| | Gloss | 88 | 88 | 92 | 91 | 90 | 91 | 94 | 92 | 87 | 89 | 90 |
| | Distinctness-of-image gloss | 1.0 | 1.0 | 1.0 | 1.0 | 1.0 | 1.0 | 1.0 | 1.0 | 1.0 | 1.0 | 1.0 |
| Fl-P | Solvent resistance | A | A | A | A | A | A | A | A | A | A | A |
| | Adhesion | A | A | A | A | A | A | A | A | A | A | A |
| | Scratch resistance | A | A | A | A | AA | AA | AA | AA | AA | AA | AA |
| | Acid resistance | 0.8 | 1.0 | 0.9 | 1.1 | 0.5 | 0.5 | 0.3 | 0.7 | 0.6 | 0.5 | 0.5 |
| | Weather resistance | Good | Good | Good | Good | Good | Good | Good | Good | Good | Good | Good |

| | | Examples | | | | | | Comp. Examples | | |
|---|---|---|---|---|---|---|---|---|---|---|
| | | 12 | 13 | 14 | 15 | 16 | 17 | 1 | 2 | 3 |
| Composition for colored base coat | | B-5 | B-1 | B-1 | B-2 | B-3 | B-4 | B-5 | B-5 | B-5 |
| Composition for clear coat | | C-12 | C-1 | C-5 | C-6 | C-7 | C-8 | C-13 | C-14 | C-15 |
| F-P | Appearance | Good | Good | Good | Good | Good | Good | Good | Good | Good |
| | Gloss | 90 | 88 | 90 | 91 | 94 | 92 | 87 | 88 | 87 |
| | Distinctness-of-image gloss | 1.0 | 1.0 | 1.0 | 1.0 | 1.0 | 1.0 | 0.7 | 0.8 | 0.6 |
| Fl-P | Solvent resistance | A | A | A | A | A | A | A | A | A |
| | Adhesion | A | A | A | A | A | A | A | A | A |
| | Scratch resistance | AA | A | AA | AA | AA | AA | C | C | C |

TABLE 2-continued

| Acid resistance | 0.3 | 1.3 | 0.6 | 0.7 | 0.4 | 0.8 | 9.0 | 9.4 | 9.2 |
| --- | --- | --- | --- | --- | --- | --- | --- | --- | --- |
| Weather resistance | Good | Good | Good | Good | Good | Good | Dulling | Dulling | Dulling |

Note:
F-P = Finishing properties
Fl-P = Film properties

Preparation Example, Examples and Comparative Examples illustrating coating compositions containing, as component (a), mixture (a-2) of polyepoxide and resin containing hydroxyl group and carboxyl group Preparation Example 16

Preparation of compositions for clear coat

Compositions (C-16) to (C-27) for a clear coat were prepared using the components shown in Table 3 in the amounts shown in the table. Among them, compositions (C-16) to (C-23) were prepared for the method of the present invention, whereas compositions (C-24) to (C-27) were prepared for comparison.

Preparation Example 17

Preparation of compositions (B-6) to (B-11) for colored base coat

Compositions (B-6) to (B-10) for a colored base coat were prepared using the components shown in Table 3 in the amounts shown in the table.

In Table 3, the amounts are all expressed in grams on solid basis. Polyepoxide (iv) is a compound represented by

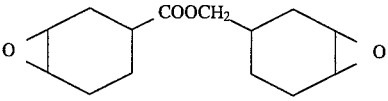

silicon compound V is "COLCOTE ES40", and the aluminum paste is "ALPASTE 4919" (trademark, product of TOYO ALUMINUM K.K., aluminum flake paste having a solid content of 65% by weight).

Composition (B-11) for a colored base coat was prepared by mixing 75 g (as solids) of resin (e) obtained in Preparation Example 5, 25 g (as solids) of "U-VAN 20SE" (trademark, product of Mitsui Toatsu Chemicals, butylated melamine resin having a solid content of 60% by weight) and 8 g (as solids) of "ALPASTE 4919".

EXAMPLE 18

A two-coat one-bake method was carried out in the following manner.

TABLE 3

| | Composition for clear coat | | | | | | | | |
| --- | --- | --- | --- | --- | --- | --- | --- | --- | --- |
| | C-16 | C-17 | C-18 | C-19 | C-20 | C-21 | C-22 | C-23 | C-24 |
| Resin (d) | 53 | 48 | 48 | 64 | 48 | 48 | 48 | 48 | 67 |
| Polyepoxide (i) | 27 | | | | | | | | 33 |
| Polyepoxide (ii) | | 32 | | | | | | | |
| Polyepoxide (iii) | | | 32 | | 32 | 32 | 32 | 32 | |
| Polyepoxide (iv) | | | | 16 | | | | | |
| Silicon Compound I | | | | | | | 20 | | |
| Silicon Compound II | | | | | | 20 | | | |
| Silicon Compound III | 20 | 20 | 20 | 20 | | | | | |
| Silicon Compound IV | | | | | 20 | | | | |
| Silicon Compound V | | | | | | | | 20 | |
| Aluminum Paste | | | | | | | | | |

| | Composition for clear coat | | | Composition for colored base coat | | | | |
| --- | --- | --- | --- | --- | --- | --- | --- | --- |
| | C-25 | C-26 | C-27 | B-6 | B-7 | B-8 | B-9 | B-10 |
| Resin (d) | 60 | 60 | 80 | 60 | 60 | 60 | 60 | 60 |
| Polyepoxide (i) | | | | | | | | |
| Polyepoxide (ii) | 40 | | | | | | | |
| Polyepoxide (iii) | | 40 | | 30 | 30 | 30 | 30 | 30 |
| Polyepoxide (iv) | | | 20 | | | | | |
| Silicon Compound I | | | | | | | 10 | |
| Silicon Compound II | | | | | | 10 | | |
| Silicon Compound III | | | | 10 | | | | |
| Silicon Comround IV | | | | | 10 | | | |
| Silicon Compound V | | | | | | | | 10 |
| Aluminum Paste | | | | 8 | 8 | 8 | 8 | 8 |

A colored base coat was formed on the substrate obtained in Preparation Example 15 by spraying, to a thickness of about 15 μm (when cured), a coating composition prepared by adding xylol to Composition (B-11) for a colored base coat to adjust the viscosity to 14 seconds (as measured by Ford cup No. 4 at 20° C., the same applies hereinafter).

After the colored base coat was allowed to stand for 3 minutes, a clear coat was formed on the colored base coat by spraying, to a thickness of about 40 μm (when cured), a coating composition prepared by adding xylol to composition (C-16) for a clear coat to the viscosity of 25 seconds.

Subsequently the colored base coat and clear coat were simultaneously heated for curing at 120° C. for 30 minutes to thereby form a top coat.

EXAMPLES 19 TO 30 AND COMPARATIVE EXAMPLES 4 TO 6

Top coats were formed by the same two-coat one-bake method as in Example 18 using the compositions for a colored base coat and the compositions for a clear coat shown in Table 4.

The top coats obtained in Examples and Comparative Examples were tested by the aforementioned methods for finishing properties (appearance, gloss and distinctness-of-image gloss) and film properties.

The test results are shown in Table 4.

TABLE 4

|  |  | Examples | | | | | | | | |
|---|---|---|---|---|---|---|---|---|---|---|
|  |  | 18 | 19 | 20 | 21 | 22 | 23 | 24 | 25 | 26 |
| Composition for colored base coat | | B-11 | B-11 | B-11 | B-11 | B-11 | B-11 | B-11 | B-11 | B-6 |
| Composition for clear coat | | C-16 | C-17 | C-18 | C-19 | C-20 | C-21 | C-22 | C-23 | C-16 |
| F-P | Appearance | Good | Good | Good | Good | Good | Good | Good | Good | Good |
|  | Gloss | 92 | 93 | 95 | 94 | 94 | 95 | 95 | 88 | 90 |
|  | Distinctness-of-image gloss | 1.0 | 1.0 | 1.0 | 1.0 | 1.0 | 1.0 | 1.0 | 1.0 | 1.0 |
| Fl-P | Solvent resistance | A | A | A | A | A | A | A | A | A |
|  | Adhesion | A | A | A | A | A | A | A | A | A |
|  | Scratch resistance | AA | AA | AA | AA | AA | AA | A | A | AA |
|  | Acid resistance | 0.5 | 0.5 | 0.3 | 0.5 | 0.6 | 0.6 | 1.7 | 1.5 | 0.5 |
|  | Weather resistance | Good | Good | Good | Good | Good | Good | Good | Good | Good |

|  |  | Examples | | | | Comp. Ex. | | | |
|---|---|---|---|---|---|---|---|---|---|
|  |  | 27 | 28 | 29 | 30 | 4 | 5 | 6 | 7 |
| Composition for colored base coat | | B-7 | B-8 | B-9 | B-10 | B-11 | B-11 | B-11 | B-11 |
| Composition for clear coat | | C-20 | C-21 | C-22 | C-23 | C-24 | C-25 | C-26 | C-27 |
| F-P | Appearance | Good | Good | Good | Good | Good | Good | Good | Good |
|  | Gloss | 92 | 93 | 93 | 86 | 92 | 93 | 95 | 94 |
|  | Distinctness-of-image gloss | 1.0 | 1.0 | 1.0 | 1.0 | 0.8 | 0.6 | 0.8 | 0.9 |
| Fl-P | Solvent resistance | A | A | A | A | A | A | A | A |
|  | Adhesion | A | A | A | A | A | A | A | A |
|  | Scratch resistance | AA | AA | A | A | C | C | C | C |
|  | Acid resistance | 0.6 | 0.6 | 1.7 | 1.5 | 9.0 | 9.2 | 9.5 | 9.1 |
|  | Weather resistance | Good | Good | Good | Good | Dulling | Dulling | Dulling | Dulling |

Note:
F-P = Finishing properties
Fl-P = Film properties

What we claim is:

1. A method of forming a top coat by forming in sequence a colored base coat on a substrate and a clear coat, the method being characterized in that at least one of the colored base coat and the clear coat is formed by a curable coating composition consisting essentially of:
   (a) (a-1) a resin having a hydroxyl group, a carboxyl group and an epoxy group in the same molecule, or (a-2) a mixture of a hydroxyl- and carboxyl-containing resin with a polyepoxide;
   (b) a silicon compound having, per molecule, at least one silanol group and/or at least one hydrolyzable group directly bound to a silicon atom; and
   (c) an organic solvent.

2. A method of forming a top coat according to claim 1 wherein the proportions of the components (a) and (b) are about 30 to about 98% by weight of the former and about 2 to about 70% by weight of the latter, based on the total of the two components.

3. A method of forming a top coat according to claim 1 wherein according to a 2-coat 1-bake system, a colored base coat is formed on a substrate, then a clear coat is formed on the base coat without curing, and the two coats are heated for curing.

4. A method of forming a top coat according to claim 1 wherein the clear coat is formed by said curable coating composition.

5. A method of forming a top coat according to claim 1 wherein the colored base coat and the clear coat are both formed by said curable coating composition.

6. A method of forming a top coat according to claim 1 or 3 wherein the colored base coat is formed by a conventional base coat composition comprising a resin component of acrylic resin/amino resin and a coloring pigment.

7. A method of forming a top coat according to claim 1 wherein the component (a) is the resin (a-1) having a hydroxyl group, a carboxyl group and an epoxy group in the same molecule.

8. A method of forming a top coat according to claim 7 wherein the resin (a-1) has a hydroxyl value of about 10 to about 300 KOHmg/g, an acid value of about 3 to about 150 KOHmg/g, and an epoxy value of about 0.1 to about 4.0 mmol/g.

9. A method of forming a top coat according to claim 7 wherein the resin (a-1) is prepared by subjecting to ring-opening half-esterification the hydroxyl group of a resin having a hydroxyl group and an epoxy group in the same molecule and a cyclic acid anhydride.

10. A method of forming a top coat according to claim 7 wherein the resin (a-1) has a number average molecular weight of about 3,000 to about 200,000.

11. A method of forming a top coat according to claim 1 wherein the component (a) is the mixture (a-2) of a hydroxyl- and carboxyl-containing resin with a polyepoxide.

12. A method of forming a top coat according to claim 11 wherein the mixture (a-2) consists of about 20 to about 80% by weight of the hydroxyl- and carboxyl-containing resin and about 20 to about 80% by weight of the polyepoxide.

13. A method of forming a top coat according to claim 11 wherein the hydroxyl- and carboxyl-containing resin has a hydroxyl value of about 10 to about 300 KOHmg/g, and an acid value of about 3 to about 150 KOHmg/g.

14. A method of forming a top coat according to claim 11 wherein the hydroxyl- and carboxyl-containing resin has a number average molecular weight of about 3,000 to about 200,000.

15. A method of forming a top coat according to claim 11 wherein the polyepoxide has an epoxy value of about 0.1 to about 4.0 mmol/g.

16. A method of forming a top coat according to claim 11 wherein the polyepoxide is a polymer prepared by radical polymerization using, as a monomer component, an epoxy-containing ethylenically unsaturated monomer.

17. A method of forming a top coat according to claim 11 wherein the polyepoxide is a copolymer prepared by radical polymerization using, as monomer components, an epoxy-containing ethylenically unsaturated monomer and a hydroxyl-containing ethylenically unsaturated monomer.

18. A method of forming a top coat according to claim 11 wherein the polyepoxide has a number average molecular weight of about 120 to about 200,000.

19. A method of forming a top coat according to claim 1 wherein the silicon compound (b) is a silicon monomer represented by the formula $$Si(OR)_4 \qquad (I)$$

wherein R represents a hydrogen atom, or $C_{1-3}$ alkyl group and/or a low condensate of the silicon monomer.

20. A method of forming a top coat according to claim 1 wherein the silicon compound (b) is a modified silicon condensate which is a low condensate of a silicon monomer represented by the formula $$Si(OR)_4 \qquad (I)$$

wherein R represents a hydrogen atom or $C_{1-3}$ alkyl group and modified in that the group R is partly substituted by a $C_{4-24}$ monovalent hydrocarbon group (which may contain an ether bond and/or ester bond).

21. A method of forming a top coat according to claim 1 wherein the silicon compound (b) is a polymer prepared by radical polymerization using, as a monomer component, an ethylenically unsaturated group-containing silicon condensate prepared by reacting a low condensate of a silicon monomer represented by the formula $$Si(OR)_4 \qquad (I)$$

wherein R represents a hydrogen atom or $C_{1-3}$ alkyl group with an ethylenically unsaturated monomer containing, per molecule, one ethylenically unsaturated group and at least one functional group reactive with an SiOR group (R is the same as above).

22. A method of forming a top coat according to claim 1 wherein the silicon compound (b) is a polymer prepared by radical polymerization using, as a monomer component, an ethylenically unsaturated group-containing silicon condensate prepared by reacting a modified silicon condensate which is a low condensate of a silicon monomer represented by the formula $$Si(OR)_4 \qquad (I)$$

wherein R represents a hydrogen atom or $C_{1-3}$ alkyl group and modified in that the group R is partly substituted by a $C_{4-24}$ monovalent hydrocarbon group (which may contain an ether bond and/or ester bond) with an ethylenically unsaturated monomer containing, per molecule, one ethylenically unsaturated group and at least one functional group reactive with an SiOR group (R is the same as above).

23. A method of forming a top coat according to claim 21 or 22 wherein the ethylenically unsaturated monomer is a hydroxyl-containing ethylenically unsaturated monomer.

* * * * *